US012658332B2

(12) United States Patent
Furuichi et al.

(10) Patent No.: US 12,658,332 B2
(45) **Date of Patent: *Jun. 16, 2026**

(54) REACTOR CONTAINMENT VESSEL VENT SYSTEM

(71) Applicant: Hitachi-GE Nuclear Energy, Ltd., Hitachi (JP)

(72) Inventors: Hajime Furuichi, Tokyo (JP); Takahisa Matsuzaki, Tokyo (JP)

(73) Assignee: Hitachi GE Vernova Nuclear Energy, Ltd., Hitachi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,474

(22) Filed: Jun. 24, 2022

(65) Prior Publication Data

US 2022/0319729 A1 Oct. 6, 2022

Related U.S. Application Data

(63) Continuation of application No. 16/962,560, filed as application No. PCT/JP2019/000752 on Jan. 11, 2019, now Pat. No. 11,404,178.

(30) Foreign Application Priority Data

Jan. 18, 2018 (JP) ................................ 2018-006097

(51) Int. Cl.

| | |
|---|---|
| *G21C 19/303* | (2006.01) |
| *G21C 9/004* | (2006.01) |
| *G21F 9/02* | (2006.01) |

(52) U.S. Cl.

CPC ........... *G21C 19/303* (2013.01); *G21C 9/004* (2013.01); *G21F 9/02* (2013.01)

(58) Field of Classification Search

CPC ...... G21C 9/004; G21C 19/30; G21C 19/303; G21F 9/02

(Continued)

(56) References Cited

U.S. PATENT DOCUMENTS

| | | | | |
|---|---|---|---|---|
| 2,548,160 A * | 4/1951 | Hunter | ..................... | F01M 1/20 184/6.24 |
| 2,902,425 A | 9/1959 | Milton | | |

(Continued)

FOREIGN PATENT DOCUMENTS

| | | |
|---|---|---|
| CN | 104409112 A * | 3/2015 |
| DE | 1273080 B | 7/1968 |

(Continued)

OTHER PUBLICATIONS

International Search Report (PCT/ISA/210) issued in PCT Application No. PCT/JP2019/000752 dated Apr. 2, 2019 with English translation (six (6) pages).

(Continued)

*Primary Examiner* — Jinney Kil
(74) *Attorney, Agent, or Firm* — Crowell & Moring LLP

(57) ABSTRACT

A reactor containment vessel vent system continuously releases steam generated in a reactor containment vessel to the atmosphere even when a power supply is lost. In the reactor containment vessel vent system, the noble gas filter that allows steam to pass through but does not allow radioactive noble gases to pass through among vent gas discharged from the reactor containment vessel is provided at a most downstream portion of the vent line. An immediate upstream portion of the noble gas filter and the reactor containment vessel are connected to each other by the return pipe via the intermediate vessel. When the radioactive noble gases having pressure equal to or higher than predetermined pressure stay in the immediate upstream portion of the noble (Continued)

① AEROSOL-SHAPED RADIOACTIVE SUBSTANCE
② RADIOACTIVE NOBLE GASES
③ WATER STEAM
④ HYDROGEN
⑤ NITROGEN AND OTHER GAS gas filter, the staying radioactive noble gases flows into the intermediate vessel by the relief valve. Thus, steam permeability is maintained and the system continuously releases the steam.

6 Claims, 7 Drawing Sheets

(58) Field of Classification Search
USPC .................................. 376/283, 310, 313, 314
See application file for complete search history.

(56) References Cited

U.S. PATENT DOCUMENTS

| | | | | |
|---|---|---|---|---|
| 3,028,327 | A | 4/1962 | Weeks | |
| 3,159,548 | A | 12/1964 | Went | |
| 3,376,357 | A | 4/1968 | Black | |
| 3,658,485 | A | 4/1972 | Gramer | |
| 3,964,965 | A | 6/1976 | Kausz | |
| 4,645,641 | A | 2/1987 | Nicolai | |
| 5,116,567 | A | 5/1992 | Fennern | |
| 5,272,738 | A | 12/1993 | Schegk | |
| 5,596,613 | A | 1/1997 | Glutz | |
| 8,218,709 | B2 | 7/2012 | Eckardt | |
| 2012/0051488 | A1 | 3/2012 | Eckardt | |
| 2013/0174732 | A1 | 7/2013 | Chantereau | |
| 2013/0180399 | A1 | 7/2013 | Chantereau | |
| 2013/0182812 | A1 | 7/2013 | Eckardt et al. | |
| 2014/0064427 | A1 | 3/2014 | Noshita et al. | |
| 2016/0189813 | A1 | 6/2016 | Cisneros | |
| 2017/0312679 | A1 | 11/2017 | Hill | |
| 2019/0348185 | A1 * | 11/2019 | Hill | B01D 53/0407 |

FOREIGN PATENT DOCUMENTS

| | | | | |
|---|---|---|---|---|
| JP | H0298689 | | * | 4/1990 |
| JP | 5-509164 | A | | 12/1993 |
| JP | 7-209488 | A | | 8/1995 |
| JP | 2011196963 | A | * | 10/2011 |
| JP | 2013-540989 | A | | 11/2013 |
| JP | 2014-48043 | A | | 3/2014 |
| JP | 2015-508502 | A | | 3/2015 |
| JP | 2016521843 | A | * | 7/2016 |
| WO | WO 2014/184296 | A1 | | 11/2014 |

OTHER PUBLICATIONS

Japanese-language Written Opinion (PCT/ISA/237) issued in PCT Application No. PCT/JP2019/000752 dated Apr. 2, 2019 (four (4) pages).

* cited by examiner

REACTOR CONTAINMENT VESSEL VENT SYSTEM

CROSS REFERENCE TO RELATED APPLICATIONS

This application is a continuation of U.S. patent application Ser. No. 16/962,560, filed Jul. 16, 2020, which is a 371 of International Application No. PCT/JP2019/000752, filed Jan. 11, 2019, which claims priority to Japanese Patent Application No. 2018-006097, filed Jan. 18, 2018, the disclosures of all of which are expressly incorporated by reference herein.

TECHNICAL FIELD

The present invention relates to a reactor containment vessel vent system for use in a nuclear power plant.

BACKGROUND ART

In a nuclear power plant, even if an unlikely event in which a reactor core disposed in a reactor pressure vessel is melted (hereinafter, referred to as a severe accident) occurs, the accident is designed to stop if sufficient water injection is performed thereafter and the reactor containment vessel is cooled. However, in a case where the cooling of the reactor containment vessel at the time of the severe accident is insufficient, generation of steam is continued and pressure in the reactor containment vessel is increased. When the pressure of the reactor containment vessel is further increased, there is a risk of a severer accident in which the reactor containment vessel is damaged and a large amount of radioactive substance is released to the atmosphere.

Therefore, when the pressure in the reactor containment vessel is increased to predetermined pressure or more, gas in the reactor containment vessel is released into the atmosphere and an operation of reducing the pressure in the reactor containment vessel is performed. The operation of reducing the pressure in the reactor containment vessel is referred to as a vent operation. When the vent operation is performed in a boiling water reactor, the gas in the reactor containment vessel (hereinafter, referred to as vent gas) is released into pool water of a suppression pool, and the radioactive substance is removed by a scrubbing effect of the pool water. Then, the vent gas from which the radioactive substance is removed is released into the atmosphere.

In the boiling water reactor in the related art, the vent gas is released into the atmosphere after the radioactive substance is removed by the pool water of the suppression pool. However, it is not possible to remove all radioactive substances only by scrubbing the pool water. Therefore, there is a reactor containment vessel vent system as a system for further removing the radioactive substance from the vent gas released into the atmosphere. The reactor containment vessel vent system in the related art includes a tank containing water that scrubs the vent gas, a pipe that introduces the vent gas into the water in the tank, a metal filter and an iodine filter provided at an outlet that discharges the vent gas from the tank, and the like.

In such a reactor containment vessel vent system, the vent gas is scrubbed by being released into the water in the tank to remove particulate radioactive substance. In addition, the particulate radioactive substance that cannot be removed by scrubbing is removed by the metal filter, and a gaseous radioactive substance such as iodine is removed by a chemical reaction or an absorption action in the iodine filter.

A noble gas filter that does not permeate radioactive noble gases is disposed at a further downstream portion (exhaust port side) of these radioactive substance removing units. The noble gas filter also removes the radioactive noble gases.

However, if the noble gas filter is simply installed, the gas containing the noble gases that cannot permeate the noble gas filter stays in a region in contact with an upstream side of the noble gas filter in a discharge pipe of the vent gas (hereinafter, referred to as immediate upstream portion). In this case, since partial pressure of the gas containing the stayed noble gases is increased, permeation performance of steam to be permeated by the noble gas filter is reduced. That is, the steam to be discharged cannot permeate the noble gas filter. As a result, even when the vent operation is performed, the reactor containment vessel vent system cannot continuously discharge the steam in the reactor containment vessel, and eventually the pressure in the reactor containment vessel cannot be lowered.

Therefore, for example, a reactor containment vessel vent system described in Patent Literature 1 includes a pipe and a mechanism for gas containing the noble gases staying in the immediate upstream portion of the noble gas filter in the vent gas outlet pipe to return to the reactor containment vessel. In this case, since the gas containing the noble gases that cannot permeate the noble gas filter does not stay in the immediate upstream portion of the noble gas filter, the noble gas filter does not hinder the discharge of the steam. That is, the permeation performance of the noble gas filter can be continuously maintained.

CITATION LIST

Patent Literature

Patent Literature 1: JP-T-2016-521843

SUMMARY OF INVENTION

Technical Problem

However, in the reactor containment vessel vent system described in Patent Literature 1, an active device such as a pump is used to return the gas stayed in the immediate upstream portion of the noble gas filter into the reactor containment vessel. In order to drive the active device such as the pump, supply of a power supply is indispensable. Therefore, when an unlikely event occurs in which the power supply is lost and the active device such as the pump cannot be driven, the noble gas filter may lose the permeation performance of the steam, and the pressure in the reactor containment vessel may not be continuously lowered.

In order to allow the pressure in the reactor containment vessel to be continuously lowered, it is necessary to prevent the noble gas filter from losing the permeation performance of the steam even in the unlikely event that the power supply is lost.

An object of the invention is to provide a reactor containment vessel vent system capable of continuously releasing steam generated in a reactor containment vessel to the atmosphere even when a power supply is lost.

Solution to Problem

The reactor containment vessel vent system according to the invention reduces pressure in a reactor containment vessel by releasing gas in the reactor containment vessel to the atmosphere. The reactor containment vessel vent system includes: a vent line that forms a vent gas flow path through which vent gas is discharged from the reactor containment vessel and released to the atmosphere; a noble gas filter provided at a most downstream portion of the vent line, the noble gas filter allowing at least steam to pass through and not allowing radioactive noble gases to pass through among the vent gas; a return pipe that connects an immediate upstream portion of the noble gas filter in the vent line and the reactor containment vessel; and an intermediate vessel provided on the return pipe, in which gas containing the radioactive noble gases that cannot permeate the noble gas filter flows and is stored.

Advantageous Effect

According to the invention, it is possible to provide a reactor containment vessel vent system capable of continuously releasing steam generated in a reactor containment vessel to the atmosphere even when a power supply is lost.

DESCRIPTION OF EMBODIMENTS

Figure 1:
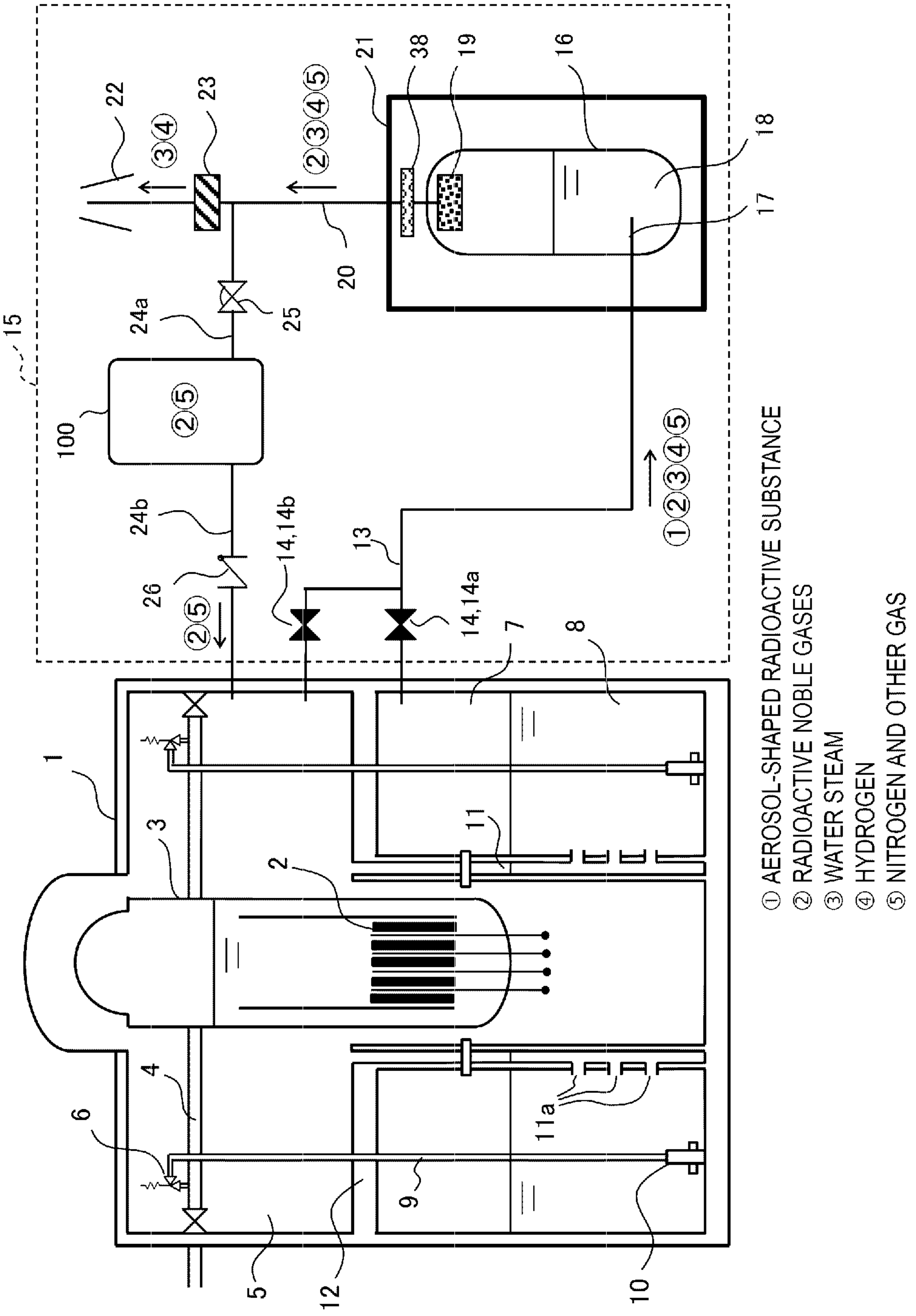
FIG. 1 is a diagram schematically showing an example of a configuration of a reactor containment vessel vent system according to a first embodiment of the invention.

Hereinafter, embodiments of the invention will be described in detail with reference to the drawings. In the drawings, the same elements are denoted by the same reference numerals, and redundant descriptions thereof are omitted.

First Embodiment

FIG. 1 is a diagram schematically showing an example of a configuration of a reactor containment vessel vent system 15 according to a first embodiment of the invention. In FIG. 1, an example of a configuration of the reactor containment vessel vent system 15 according to the present embodiment is shown in a broken-line frame, and an example of a schematic cross-sectional structure of a reactor containment vessel 1 is shown on a left side of the frame.

As shown in FIG. 1, a reactor pressure vessel 3 containing a reactor core 2 is installed in the reactor containment vessel 1. A main steam pipe 4 is connected to the reactor pressure vessel 3 to send steam generated in the reactor pressure vessel 3 to a turbine (not shown) for power generation. In the present specification, the term "steam" refers to water steam.

The inside of the reactor containment vessel 1 is partitioned into a dry well 5 and a wet well 7 by a diaphragm floor 12 made of reinforced concrete. The wet well 7 refers to a region in which pool water is stored therein. A pool in the wet well 7 is referred to as a suppression pool 8. The dry well 5 and the wet well 7 communicate with each other by vent pipes 11, and vent pipe exhaust portions 11*a* are opened below a water surface of the suppression pool 8 in the wet well 7.

A pipe break accident in which a part of a pipe such as the main steam pipe 4 is damaged and the steam flows into the reactor containment vessel 1 is generally known as a name of Loss of Coolant Accident (LOCA). Such an accident usually occurs in the dry well 5 through which the main steam pipe 4 passes. In an unlikely event that such an accident occurs and the steam flows out into the dry well 5 from a break hole of the main steam pipe 4 or the like, first, pressure in the dry well 5 rises.

The steam flowing out into the dry well 5 is guided into the water of the suppression pool 8 in the wet well 7 through the vent pipe 11 due to a pressure difference between the dry well 5 and the wet well 7. At this time, since the steam is condensed by the pool water in the suppression pool 8, the pressure rise in the reactor containment vessel 1 is prevented. Most of the radioactive substances contained in the steam are removed by a scrubbing effect of the pool water in the suppression pool 8.

In the reactor containment vessel 1 of a boiling water reactor, when the pressure in the reactor pressure vessel 3 or the main steam pipe 4 rises abnormally, a steam relief safety valve 6, a steam relief safety valve exhaust pipe 9, a quencher 10, and the like are provided as units that reduce the pressure. This is to prevent an accident such as the LOCA from occurring not only when the pressure rise is merely an abnormal pressure rise.

That is, when the pressure in the reactor pressure vessel 3 or the main steam pipe 4 rises abnormally, the steam relief safety valve 6 provided in the main steam pipe 4 is opened, and the steam in the main steam pipe 4 is released into the water of the suppression pool 8 through the steam relief safety valve exhaust pipe 9 and the quencher 10. Since most of the steam is condensed by releasing the steam into the water in the suppression pool 8, the pressure in the reactor pressure vessel 3 and the main steam pipe 4 is reduced. Most of the radioactive substances contained in the steam are removed by the scrubbing effect of the pool water in the suppression pool 8.

As described above, in the present embodiment, by condensing the steam in the suppression pool 8 and cooling the pool water in the suppression pool 8 with a residual heat removal system (not shown), it is possible to prevent temperature and pressure in the reactor containment vessel 1 from rising. That is, a steam outflow accident from the main steam pipe 4 or the like to the dry well 5 can usually be stopped.

However, if the residual heat removal system loses function although unlikely, the temperature of the pool water in the suppression pool 8 rises. As the temperature of the pool water rises, since partial pressure of the steam in the reactor containment vessel 1 rises up to saturated steam pressure of the temperature of the pool water, the pressure in the reactor containment vessel 1 rises. When such pressure rise occurs, the pressure rise can be prevented by spraying cooling water into the reactor containment vessel 1. In addition, the spray can be operated by connecting a fire pump or the like from the outside.

Further, the spray may not work although unlikely. In this case, the pressure in the reactor containment vessel 1 continues to rise. When the pressure rise in the reactor containment vessel 1 occurs, the pressure rise in the reactor containment vessel 1 can be prevented by releasing the gas in the reactor containment vessel 1 to the outside. The operation is referred to as a vent operation. In the boiling water reactor, the vent operation is performed by releasing the gas in the wet well 7 to the outside (atmosphere). Since the gas in the wet well 7 is gas in which most of the radioactive substances are removed from the pool water of the suppression pool 8, pollution caused by the radioactive substances in the atmosphere is minimized.

When performing the above-described vent operation, the reactor containment vessel vent system 15 is provided as a device to remove the radioactive substances from the gas (hereinafter, referred to as vent gas) released from the reactor containment vessel 1. Hereinafter, the reactor containment vessel vent system 15 will be described in detail. In a portion surrounded by a broken line in FIG. 1 (reactor containment vessel vent system 15), an arrow on a side of a pipe represented by a solid line indicates a direction of flow of the vent gas, and Roman numerals indicate an approximate type of gas contained in the vent gas.

As shown in FIG. 1, one end of a vent pipe 13 is branched and connected to both the dry well 5 and the wet well 7 of the reactor containment vessel 1, and isolation valves 14 are disposed in the branched vent pipe 13. The other end of the vent pipe 13 is connected to an inlet pipe 17 of a filter vent vessel 16, and a distal end portion of the inlet pipe 17 is open into the filter vent vessel 16.

Scrubbing water 18 is stored in a lower side of the filter vent vessel 16, and a metal filter 19 and an iodine filter 38 are provided in series on an upper side of the filter vent vessel 16. One end of an outlet pipe 20 of the filter vent vessel 16 is connected to the metal filter 19 and the iodine filter 38. The other end of the outlet pipe 20 passes through a shield wall 21 and is guided to the outside of the shield wall 21, and finally connected to an exhaust column 22 via a noble gas filter 23.

The vent operation is usually started by opening an isolation valve **14*a* on the wet well 7 side. That is, when the pressure in the reactor containment vessel 1 rises abnormally due to a severe accident or the like, the isolation valve 14*a* on the wet well 7 side is opened as the vent operation. At this time, high pressure gas filled in the reactor containment vessel 1 passes through the pool water of the suppression pool 8 and is released to the wet well 7 side. At this time, since the gas such as the steam released to the wet well 7 side is scrubbed by the pool water of the suppression pool 8**, most of the radioactive substances are removed. This is a main safety feature of the boiling water reactor.

Next, the gas in the wet well 7 passes through the isolation valve **14*a* opened by the vent operation as the vent gas, and is further released into the scrubbing water 18 in the filter vent vessel 16 via the vent pipe 13 and the inlet pipe 17**. At this time, the vent gas passing through the vent pipe contains steam (water steam), hydrogen, nitrogen, or the like as main components, and also includes an aerosol-shaped radioactive substance, radioactive noble gases, and the like.

The vent gas released into the scrubbing water 18 is scrubbed by the scrubbing water 18, and most of the aerosol-shaped radioactive substance is removed. Further, a gaseous radioactive substance such as iodine is removed from the vent gas scrubbed by the scrubbing water 18 by the metal filter 19 and the iodine filter 38. Therefore, the vent gas passing through the outlet pipe 20 on a downstream side of the iodine filter 38 is removed of the aerosol-shaped radioactive substance, radioactive iodine, or the like.

Further, in the present embodiment, the noble gas filter 23 is provided in the vicinity of the exhaust column 22 on the outlet pipe 20 extending from the filter vent vessel 16 to the exhaust column 22 via the iodine filter 38. The noble gas filter 23 is formed of a filter material that does not allow the radioactive noble gases and nitrogen gas to pass through but allow the water steam or hydrogen gas to permeate. Therefore, only the water steam and the hydrogen gas are released to the atmosphere from the exhaust column 22.

In the above-described reactor containment vessel vent system 15, a vent gas flow path including pipes, radioactive substance removing units, and the like from the reactor containment vessel 1 to the exhaust column 22 via the vent pipe 13, the filter vent vessel 16, the outlet pipe 20, and the like, is referred to as a vent line.

In the above-described reactor containment vessel vent system 15, the noble gas filter 23 can remove the radioactive noble gases no matter at which position the noble gas filter 23 is disposed on the vent pipe 13 and the outlet pipe 20. However, it is considered that a best selection for the noble gas filter 23 to be placed is at a most downstream portion of the outlet pipe 20. In this case, since the noble gas filter 23 is disposed on the downstream side of the filter vent vessel 16, the metal filter 19, and the iodine filter 38, it is possible to prevent the aerosol-shaped radioactive substance or the like from adhering to the noble gas filter 23.

Therefore, in this case, it is possible to prevent performance degradation due to adherence of the radioactive substance or the like to the noble gas filter 23. In addition, it is possible to prevent exposure to influence of a molten fuel that may occur during the severe accident. Therefore, reliability of the reactor containment vessel vent system 15 can be improved.

As described above, the reactor containment vessel vent system 15 according to the present embodiment can confine the radioactive noble gases and discharge the steam from the exhaust column 22 to the outside even if the severe accident occurs in which the steam or the radioactive substances are generated in the reactor containment vessel 1. Therefore, the pressure in the reactor containment vessel 1 can be reduced.

Next, the filter material of the noble gas filter 23 will be described. The noble gas filter 23 is required to permeate the steam. In order to prevent the pressure rise in the reactor containment vessel 1, the hydrogen gas generated when the reactor core 2 is melted is also required to be permeated. A molecular diameter of the steam (water) or hydrogen that permeates the noble gas filter 23 is as small as 0.3 nm or less, and a molecular diameter of the radioactive noble gases that does not permeate (Kr, Xe, and the like) is considerably larger than that. Therefore, as a structural material of the noble gas filter 23, a molecular sieve film that selectively permeates the steam and the hydrogen gas having a small molecular diameter can be used.

In the case of the boiling water reactor, the gas in the reactor containment vessel 1 is replaced with nitrogen. Therefore, when selecting the radioactive noble gases using the molecular sieve film that uses the molecular diameter, the molecular sieve film may not permeate nitrogen molecules having a molecular diameter close to the size of the molecular diameter of Kr or Xe. However, from the viewpoint of reducing the pressure in the reactor containment vessel 1, since the cause of the pressure rise is the steam and the hydrogen gas, it does not matter even if the molecular sieve film does not allow the nitrogen molecules to permeate.

Examples of the filter material of the molecular sieve film suitable for the above condition include a polymer film containing polyimide as a main component, a ceramic film containing silicon nitride as the main component, a graphene oxide film containing carbon as the main component, and the like. These molecular sieve films are generally known as filters used for hydrogen purification. The filter material of the noble gas filter 23 may be any film as long as it is a film that does not permeate Kr or Xe but permeates molecules of hydrogen or water (steam).

Since the noble gas filter 23 using the filter material as described above permeates the steam and the hydrogen gas and does not permeate the nitrogen and the radioactive noble gases, it is possible to release the steam and the hydrogen gas that cause the pressure rise in the reactor containment vessel 1 while removing the radioactive noble gases.

However, when the radioactive noble gases are removed from the vent gas by the noble gas filter 23, there is a problem that the permeation performance of the noble gas filter 23 for the steam and the hydrogen gas reduces with the passage of time, which is also a technical problem in the related art. The problem is caused by staying of the nitrogen gas and the radioactive noble gases that cannot permeate the noble gas filter 23 in a region in the outlet pipe 20 that is in contact with the upstream side of the noble gas filter 23 (hereinafter, referred to as an immediate upstream portion of the noble gas filter 23 or simply an immediate upstream portion).

That is, when the nitrogen gas and the radioactive noble gases that cannot permeate the noble gas filter 23 stays in the immediate upstream portion of the noble gas filter 23, partial pressure of the gas rises, and the permeation of the steam and the hydrogen gas to be permeated by the noble gas filter 23 is hindered. Therefore, the permeation performance of the steam and the hydrogen gas by the noble gas filter 23 is reduced, and eventually a permeation function is lost.

When the permeation function of the steam and the hydrogen gas by the noble gas filter 23 is lost, the pressure of the immediate upstream portion of the noble gas filter 23 rises to the same level as the pressure in the reactor containment vessel 1. This means that the function of the vent is lost.

In order to prevent such a situation, the reactor containment vessel vent system 15 according to the present embodiment includes an intermediate vessel 100 for separately storing the gas such as the nitrogen gas and the radioactive noble gases staying in the immediate upstream portion of the noble gas filter 23. The immediate upstream portion of the noble gas filter 23 is connected to the intermediate vessel 100 via a return pipe 24*a*. A relief valve 25 is provided on the return pipe 24*a*.

The relief valve 25 is constituted by a diaphragm type relief valve or the like, and has a structure that opens when fluid pressure on a primary side exceeds a set pressure PA and closes when the fluid pressure on the primary side falls below a set pressure PB (PB<PA). Therefore, in the present embodiment, when the pressure of the immediate upstream portion of the noble gas filter 23 rises and exceeds the set pressure PA, the relief valve 25 is opened. At this time, the gas such as the nitrogen gas and the radioactive noble gases staying in the immediate upstream portion of the noble gas filter 23 flows into the intermediate vessel 100. Initial pressure in the intermediate vessel 100 is preferably vacuum pressure or atmospheric pressure, and it is desirable that the gas in an initial state has oxygen removed by nitrogen substitution or the like.

Therefore, in the reactor containment vessel vent system 15 according to the present embodiment, the pressure of the gas staying in the immediate upstream portion of the noble gas filter 23 can be reduced to the set pressure PA of the relief valve 25 or less. That is, the partial pressure of a total of the nitrogen gas and the radioactive noble gases in the immediate upstream portion of the noble gas filter 23 does not exceed a predetermined value.

Therefore, in the present embodiment, the noble gas filter 23 can continuously maintain the performance of permeating the steam and the hydrogen gas without permeating the nitrogen gas and the radioactive noble gases. That is, in the reactor containment vessel vent system 15 according to the present embodiment, the steam and the hydrogen gas that cause an increase in the pressure in the containment vessel 1 can be continuously released to the outside even at the time of the severe accident or the like so that the pressure in the reactor containment vessel 1 can be continuously reduced.

Further, in the present embodiment, the intermediate vessel 100 and the reactor containment vessel 1 are connected via a return pipe 24*b*, and a check valve 26 is provided on the return pipe 24*b*. The check valve 26 blocks the flow of the fluid from the reactor containment vessel 1 to the intermediate vessel 100, and in the present embodiment, prevents the radioactive substance in the containment vessel 1 from flowing into the intermediate vessel 100.

On the other hand, the check valve 26 does not block the flow of the fluid from the intermediate vessel 100 to the reactor containment vessel 1. Therefore, when the pressure in the intermediate vessel 100 becomes higher than the pressure in the reactor containment vessel 1, the gas stored in the intermediate vessel 100 flows into the reactor containment vessel 1. Therefore, in the present embodiment, it is possible to prevent the pressure in the reactor containment vessel 1 from reducing more than necessary.

Incidentally, in order to cool the reactor pressure vessel 3 and the reactor containment vessel 1, when cooling water is sprayed into the reactor containment vessel 1 after the vent operation, the pressure in the reactor containment vessel 1 may reduce more than necessary. Alternatively, natural cooling for a long time may reduce the pressure in the reactor containment vessel 1 more than necessary. In such a case, the gas stored in the intermediate vessel 100 flows into the reactor containment vessel 1.

The check valve 26 is not limited to a check valve, and a relief valve may be used instead. However, in this case, a set pressure of valve opening of the relief valve needs to be set to a value lower than initial pressure in the reactor containment vessel 1.

Figure 2:
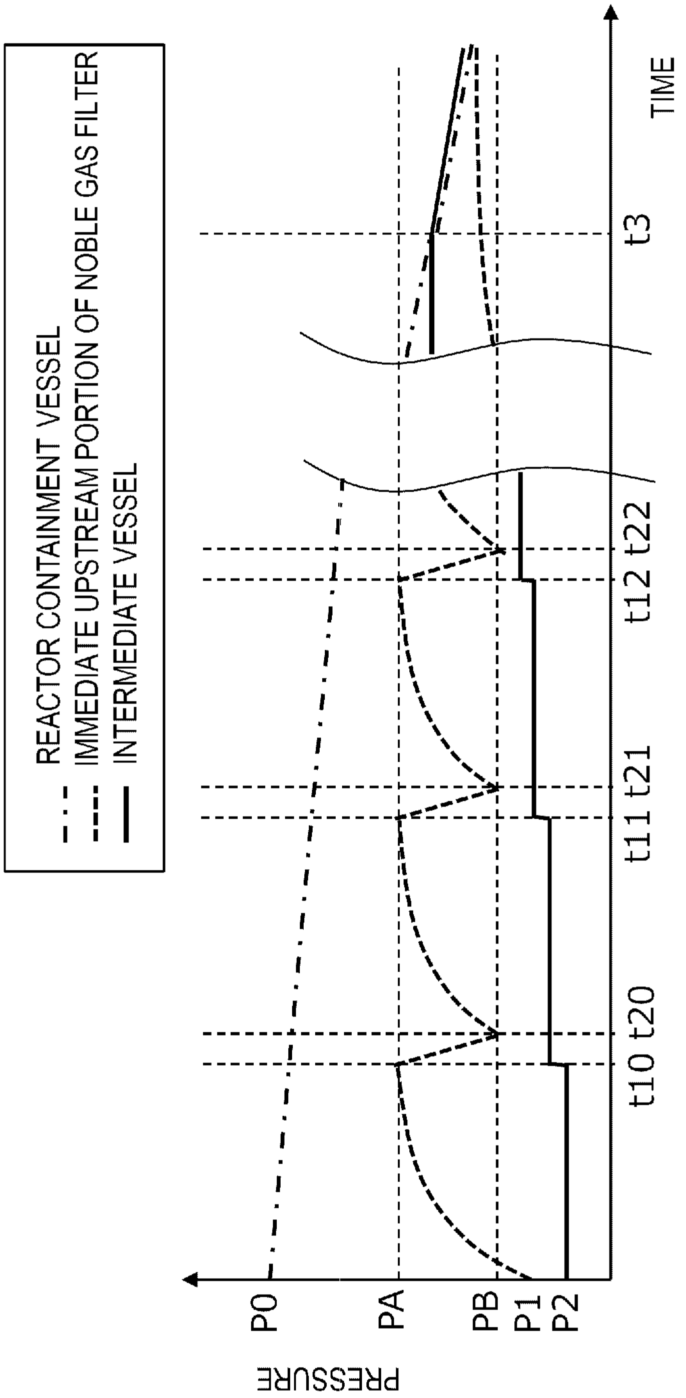
FIG. 2 is a diagram showing an example of time transition of pressure in each of a reactor containment vessel, an immediate upstream portion of a noble gas filter, and an intermediate vessel after a vent operation in the reactor containment vessel vent system according to the first embodiment of the invention.

FIG. 2 is a diagram showing an example of time transition of pressure in each of the reactor containment vessel 1, the immediate upstream portion of the noble gas filter 23, and the intermediate vessel 100 after the vent operation in the reactor containment vessel vent system 15 according to the first embodiment of the invention. In FIG. 2, a horizontal axis of the graph represents time, a vertical axis represents pressure, dashed-dotted lines represent pressure in the reactor containment vessel 1, thick broken lines represent pressure in the immediate upstream portion of the noble gas filter 23, and thick solid lines represent pressure in the intermediate vessel 100.

Here, initial pressure in the reactor containment vessel 1 is P0, initial pressure of the immediate upstream portion of the noble gas filter 23 is P1, initial pressure of the intermediate vessel 100 is P2, set pressure of the valve opening of the relief valve 25 is PA, and set pressure of valve closing is PB. In FIG. 2, t10, t11, t12, . . . represent time of the valve opening of the relief valve 25, t20, t21, t22, . . . represent time of the value closing of the relief valve 25, and t3 represents time of the valve opening of the check valve 26.

The initial pressure P1 of the immediate upstream portion of the noble gas filter 23 is approximately the same as the atmospheric pressure. However, when the vent operation is performed, the pressure of the immediate upstream portion of the noble gas filter 23 gradually rises due to the vent gas released from the reactor containment vessel. This is because the nitrogen gas and the radioactive noble gases stay in the immediate upstream portion of the noble gas filter 23 and the permeation of the steam and the hydrogen gas that permeate the noble gas filter 23 is hindered.

When the pressure of the immediate upstream portion of the noble gas filter 23 exceeds the set pressure PA of the relief valve 25, the relief valve 25 opens (time t10), and the nitrogen gas and the radioactive noble gases staying in the immediate upstream portion of the noble gas filter 23 flows into the intermediate vessel 100. At this time, since the steam permeation performance of the noble gas filter 23 is recovered, the pressure at the immediate upstream portion of the noble gas filter 23 decreases. When the pressure at the immediate upstream portion of the noble gas filter 23 decreases to the set pressure PB of the relief valve 25 or less, the relief valve 25 is closed (time t20).

Therefore, the nitrogen gas and the radioactive noble gases start to stay again at the immediate upstream portion of the noble gas filter 23, and the pressure turns to rise. After that, the same operation as those described above is repeated until the times t11 and t21, further until the times t12 and t22, and so on. Therefore, since the pressure of the immediate upstream portion of the noble gas filter 23 rises at most up to the set pressure PA of the relief valve 25, the permeation performance of the steam and the hydrogen gas by the noble gas filter 23 can maintain at a constant performance. Therefore, since the steam and the hydrogen gas is continuously discharged from the reactor containment vessel 1, the pressure in the reactor containment vessel 1 gradually reduces.

The pressure in the intermediate vessel 100 gradually rises in accordance with the amount of the nitrogen gas and the radioactive noble gases flowing into the relief valve 25 at the time of the valve opening. When the pressure in the intermediate vessel 100 exceeds the pressure in the reactor containment vessel 1, the check valve 26 opens (time t3), and the nitrogen gas and the radioactive noble gases stored in the intermediate vessel 100 flow into the reactor containment vessel 1. Thus, the nitrogen gas and the radioactive noble gases are returned to the reactor containment vessel 1.

As described above, in the present embodiment, the intermediate vessel 100, the relief valve 25, and the check valve 26 which are provided to reduce the pressure at the immediate upstream portion of the noble gas filter 23 are passive components that operate without external power such as a power supply. Therefore, when the pressure reaches the set pressure PA of the relief valve 25, the gas such as the nitrogen and the radioactive noble gases staying in the immediate upstream portion of the noble gas filter 23 moves into the intermediate vessel 100 without being supplied with the power supply. When the pressure of the gas in the intermediate vessel 100 becomes higher than the pressure in the reactor containment vessel 1, the gas stored in the intermediate vessel 100 moves, that is, returns to the reactor containment vessel 1 without being supplied with the power supply.

Therefore, the reactor containment vessel vent system 15 according to the present embodiment can continuously reduce the pressure in the reactor containment vessel 1 without releasing the radioactive noble gases to the outside even when the unlikely event such as lost of the power supply occurs. At this time, it is also possible to prevent the pressure in the reactor containment vessel 1 from reducing more than necessary.

In the present embodiment, the immediate upstream portion of the noble gas filter 23 and the reactor containment vessel 1 are connected by the return pipe 24*a*, the intermediate vessel 100, and the return pipe 24*b* of one system, and may be connected by the return pipe 24*a*, the intermediate vessel 100, and the return pipe 24*b* of a plurality of systems. In this case, capacity of the intermediate vessel 100 can be made smaller than in the case of one system.

In this case, even when the intermediate vessel 100 and the return pipes 24*a* and 24*b* of one system cannot be used due to some reason, the pressure at the immediate upstream portion of the noble gas filter 23 can be reduced by using the intermediate vessel 100 and the return pipes 24*a* and 24*b* of remaining systems. Therefore, reliability of the reactor containment vessel vent system 15 can be improved.

In the above description of the first embodiment, it is assumed that the reactor containment vessel vent system 15 is applied to an improved boiling water reactor, and it is needless to say that the reactor containment vessel vent system 15 can be applied to a reactor type other than a light water reactor such as a pressurized water reactor or a high-speed growth reactor. In the reactor containment vessel vent system 15 according to the first embodiment, a wet radioactive substance removing device such as the filter vent vessel 16 is used as the radioactive substance removing device, and a dry radioactive substance removing device can also be used. These circumstances are the same in second to fourth embodiments described below.

Second Embodiment

Figure 3:
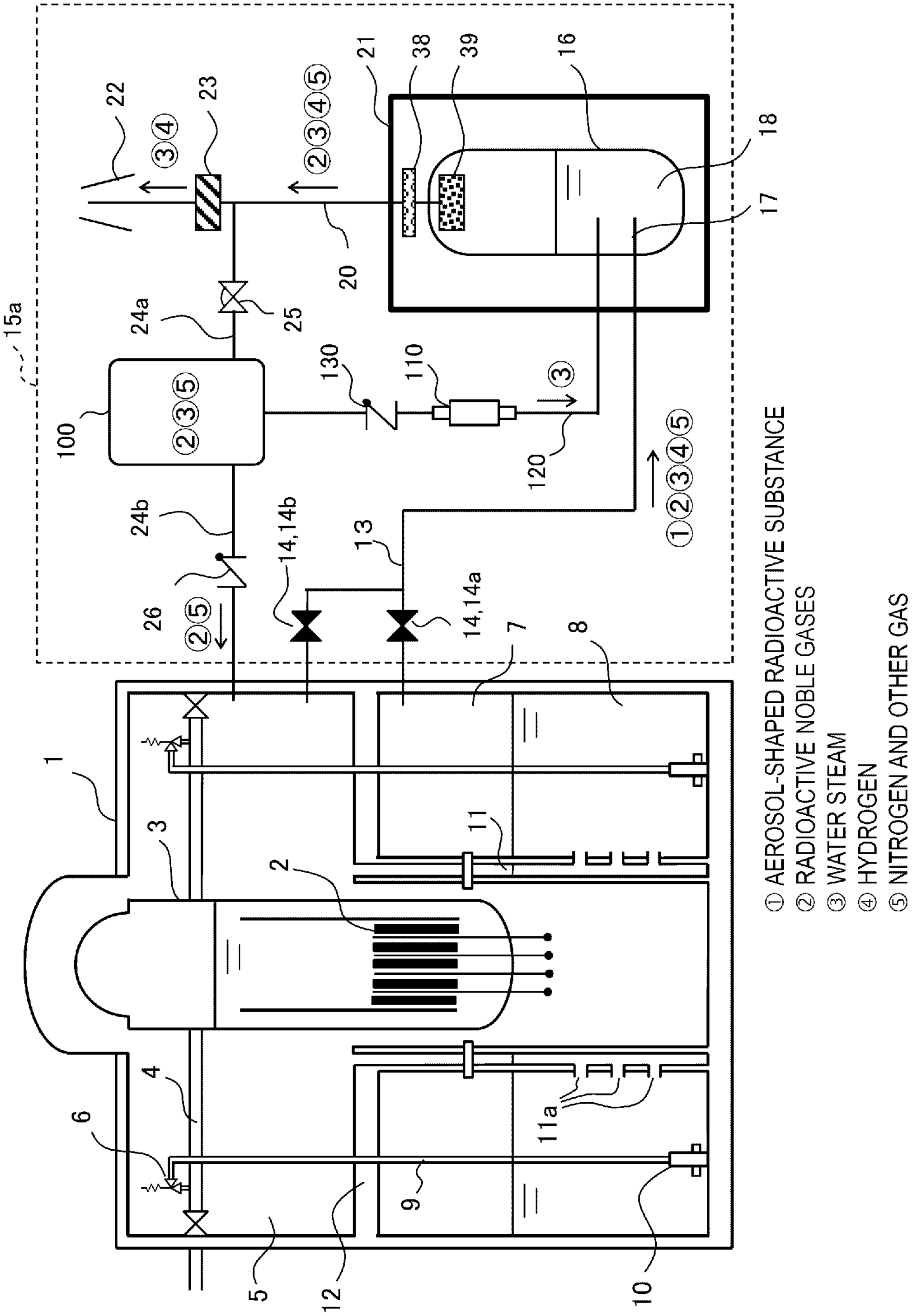
FIG. 3 is a diagram schematically showing an example of a configuration of a reactor containment vessel vent system according to a second embodiment of the invention.

FIG. 3 is a diagram schematically showing an example of a configuration of a reactor containment vessel vent system 15*a* according to a second embodiment of the invention. In FIG. 3, an example of a configuration of the reactor containment vessel vent system 15*a* according to the present embodiment is shown in a broken-line frame, and an example of a schematic cross-sectional structure of the reactor containment vessel 1 is shown on a left side of the frame.

The configuration of the reactor containment vessel vent system 15*a* according to the present embodiment is different from the configuration of the reactor containment vessel vent system 15 (see FIG. 1) according to the first embodiment in that a bypass pipe 120, a steam trap 110, and a check valve 130 are newly added. Hereinafter, differences from the first embodiment will be described.

In the first embodiment, the nitrogen gas and the radioactive noble gases staying in the immediate upstream portion of the noble gas filter 23 flow into the intermediate vessel 100, and the inflow of the steam is ignored. However, when the relief valve 25 is opened, not only the nitrogen gas and the radioactive noble gases but also a part of the steam may flow into the intermediate vessel 100. Therefore, in the present embodiment, in addition to the nitrogen gas and the radioactive noble gases, a part of the steam to be originally released into the atmosphere flows into the intermediate vessel 100.

When the steam flows into the intermediate vessel 100, the steam cools and condenses in the intermediate vessel 100, and accumulates in the intermediate vessel 100 as condensed water. Therefore, in the present embodiment, the bypass pipe 120 connecting the intermediate vessel 100 and the filter vent vessel 16 and the steam trap 110 provided on the bypass pipe 120 are added to the configuration of the reactor containment vessel vent system 15 (see FIG. 1) according to the first embodiment.

Specifically, the bypass pipe 120 connected to the filter vent vessel 16 is provided downward from a bottom of the intermediate vessel 100. The check valve 130 and the steam trap 110 are provided on the bypass pipe 120. Therefore, when the steam flowing into the intermediate vessel 100 cools and becomes condensed water, the steam flows into the filter vent vessel 16 via the bypass pipe 120 due to gravity. The steam trap 110 has a function of allowing only condensed water to pass through and not allowing a gas component (steam) thereof to pass through. Therefore, only the condensed water flows into the filter vent vessel 16.

The check valve 130 prevents the condensed water from flowing back into the intermediate vessel 100, and may also be omitted. Here, a connection destination of the bypass pipe 120 from the intermediate vessel 100 to the filter vent vessel 16 is assumed to be inside the filter vent vessel 16, and may be either the upstream side or the downstream side of the filter vent vessel 16.

As described above, according to the present embodiment, the steam flowing into the intermediate vessel 100 becomes condensed water and returns to the filter vent vessel 16. Therefore, more nitrogen gas and radioactive noble gases can be stored in the intermediate vessel 100. In consideration of the contrary, a volume of the intermediate vessel 100 can be reduced accordingly. Furthermore, in the present embodiment, since the condensed water is returned to the filter vent vessel 16, an effect of preventing a reduction in the scrubbing water 18 can also be expected.

As described above, in the present embodiment, the intermediate vessel 100, the relief valve 25, and the check valve 26 which are provided to reduce the pressure at the immediate upstream portion of the noble gas filter 23 are passive components that operate without external power such as a power supply. Therefore, the reactor containment vessel vent system 15*a* according to the present embodiment can continuously reduce the pressure in the reactor containment vessel 1 without releasing the radioactive noble gases to the outside even when the unlikely event such as lost of a power supply occurs. At this time, it is also possible to prevent the pressure in the reactor containment vessel 1 from reducing more than necessary.

Third Embodiment

Figure 4:
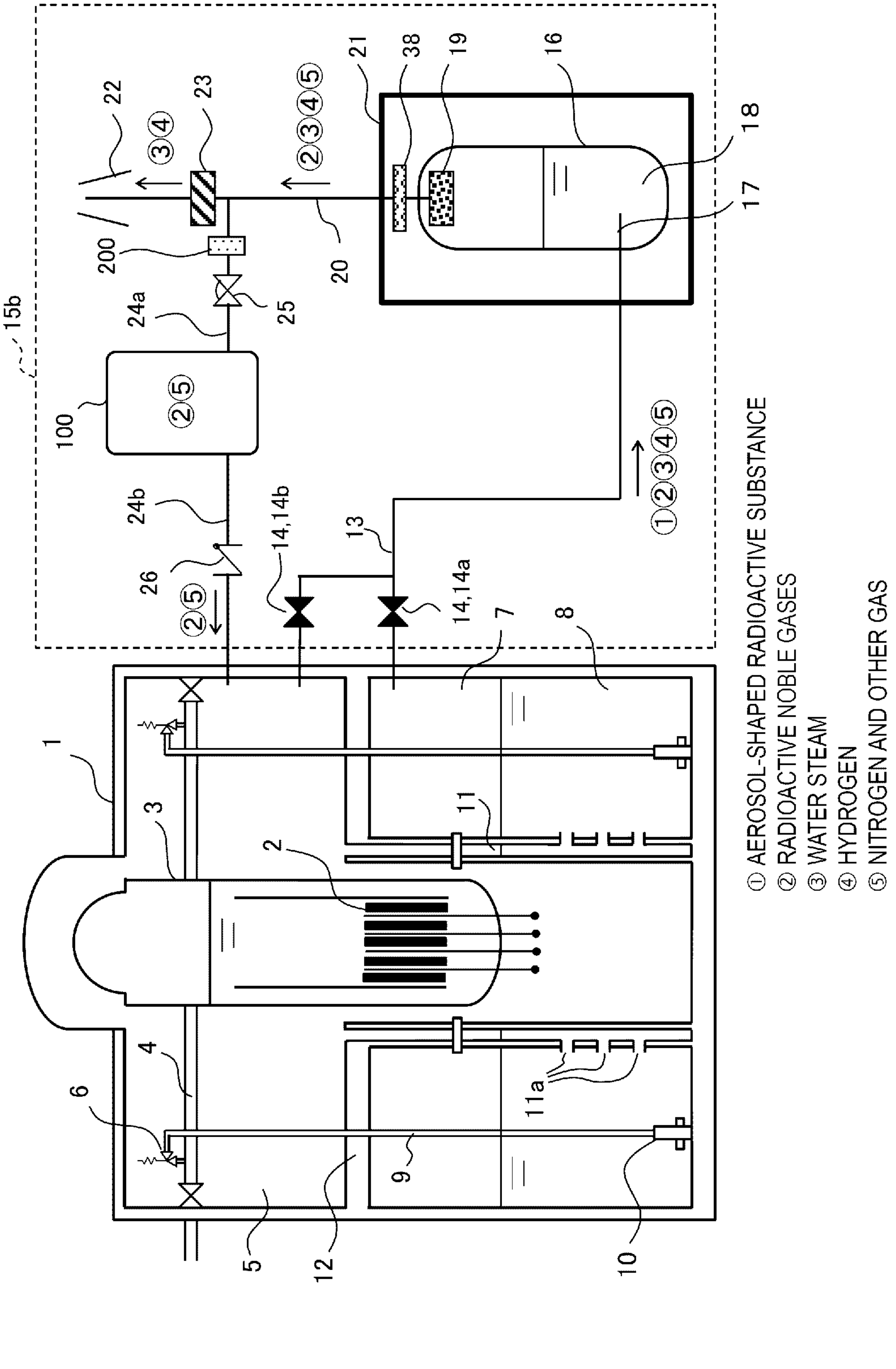
FIG. 4 is a diagram schematically showing an example of a configuration of a reactor containment vessel vent system according to a third embodiment of the invention.

FIG. 4 is a diagram schematically showing an example of a configuration of a reactor containment vessel vent system 15*b* according to a third embodiment of the invention. In FIG. 4, an example of a configuration of the reactor containment vessel vent system 15*b* according to the present embodiment is shown in a broken-line frame, and an example of a schematic cross-sectional structure of the reactor containment vessel 1 is shown on a left side of the frame.

The configuration of the reactor containment vessel vent system 15*b* according to the present embodiment is different from the configuration of the reactor containment vessel vent system 15 (see FIG. 1) according to the first embodiment in that a non-condensable gas collection system 200 is newly added. Hereinafter, differences from the first embodiment will be described.

Nitrogen gas and radioactive noble gases staying in an immediate upstream portion of the noble gas filter 23 flow into the intermediate vessel 100 when the relief valve 25 is opened, and at this time, steam to be originally released to the outside also flows into the intermediate vessel 100. Therefore, in the present embodiment, in order to prevent the inflow of the steam, the non-condensable gas collection system 200 is added to the reactor containment vessel vent system 15 (see FIG. 1) according to the first embodiment.

As shown in FIG. 4, the non-condensable gas collection system 200 is provided on the return pipe 24*a* that connects the immediate upstream portion of the noble gas filter 23 and the relief valve 25. Non-condensable gases such as the nitrogen gas and the radioactive noble gases that does not condense at a temperature of about room temperature is collected, and the collected non-condensable gases are caused to flow into the intermediate vessel 100.

A principle of non-condensable gas collection in the non-condensable gas collection system 200 is basically to remove condensable gas by cooling condensable and non-condensable mixed gas and condensing the condensable gas such as the steam. In this case, cooling of the gas by natural convection of air or water can be used.

Figure 5:
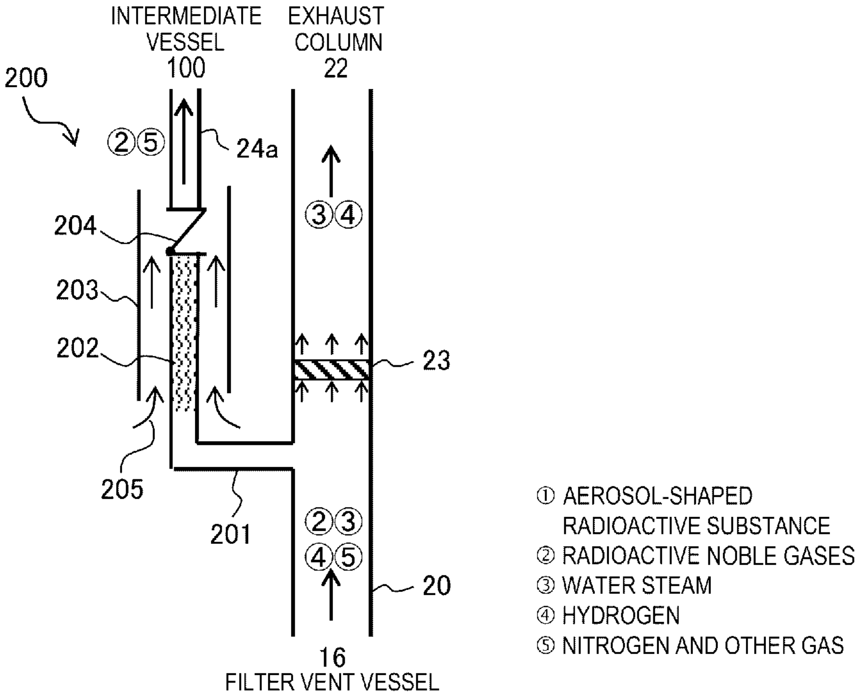
FIG. 5 is a diagram schematically showing an example of a configuration of a non-condensable gas collection system used in the reactor containment vessel vent system according to the third embodiment of the invention.

FIG. 5 is a diagram schematically showing an example of a configuration of the non-condensable gas collection system 200 used in the reactor containment vessel vent system 15*b* according to the third embodiment of the invention. As shown in FIG. 5, the non-condensable gas collection system 200 includes a condensing pipe 201 that captures non-condensable gases 202 (excluding the hydrogen gas), a pipe jacket 203 that allows outside air 205 to flow between outer surface of a pipe and inner surface of the pipe jacket, and a check valve 204.

The condensing pipe 201 branches from the immediate upstream portion of the noble gas filter 23 of the outlet pipe 20 and is provided substantially vertically from below to above. The condensing pipe 201 is connected to the return pipe 24*a* via the check valve 204, and is further connected to the intermediate vessel 100. Here, a vertical portion of the condensing pipe 201 including the check valve 204 is covered by the cylindrical pipe jacket 203 at its outer peripheral portion, and a gap is provided between the pipe jacket 203 and the outer peripheral portion of the condensing pipe 201 and the check valve 204 to allow the outside air 205 to flow between outer surface of the pipe and inner surface of the pipe jacket.

In this case, the non-condensable gases 202 such as the high-temperature nitrogen gas and the radioactive noble gases stays in the condensing pipe 201, and the cold outside air 205 flows into the gap between the condensing pipe 201 and the pipe jacket 203. Therefore, the outside air 205 flowing into the gap between the condensing pipe 201 and the pipe jacket 203 is heated by the heat of the condensing pipe 201 side, and becomes a rising air flow due to a chimney effect. Therefore, the cold outside air 205 is taken into the gap between the outer peripheral portion of the condensing pipe 201 and the pipe jacket 203, and the gas including the non-condensable gases 202 staying in the condensing pipe 201 is cooled. The longer the pipe jacket 203, a larger chimney effect can be provided.

Hereinafter, the principle of the non-condensable gases collection by the non-condensable gas collection system 200 will be described.

When the nitrogen and the radioactive noble gases stay in the immediate upstream portion of the noble gas filter 23, the permeation performance of the steam by the noble gas filter 23 is reduced. Therefore, the nitrogen and the radioactive noble gases including the steam flow into the condensing pipe 201. The gas flowing into the condensing pipe 201 is cooled by the outside air 205 flowing through the gap between the pipe jacket 203 and the outer peripheral portion of the condensing pipe 201. At this time, when the temperature falls below a dew point of the steam, the steam included in the gas starts to condense.

When the steam condenses, the volume decreases accordingly, and thus the pressure in the condensing pipe 201 reduces locally. At this time, the non-condensable gases 202 staying in the immediate upstream portion of the noble gas filter 23 is instantaneously supplied to the local portion where the pressure is reduced. At this time, although the steam also flows due to a density difference, it can be said that only the non-condensable gases 202 is supplied since the inflow steam instantaneously condenses. Eventually, the non-condensable gases such as the nitrogen and the radioactive noble gases stays in the condensing pipe 201.

Thereafter, when the nitrogen and the radioactive noble gases further stay in the immediate upstream portion of the noble gas filter 23 and the noble gas filter 23 loses the permeation performance of the steam, the pressure in the condensing pipe 201 further rises. When the pressure exceeds the set pressure PA of the relief valve 25 (see FIG. 4) provided on the downstream side of the check valve 204, the relief valve 25 opens, and the non-condensable gases such as the nitrogen and the radioactive noble gases staying in the condensing pipe 201 flow into the intermediate vessel 100. In this manner, the non-condensable gas collection system 200 can collect the non-condensable gases and store the collected non-condensable gases in the intermediate vessel 100.

Here, it is assumed that the condensing pipe 201 is disposed at a position higher than the filter vent vessel 16. In this case, the condensed water condensed in the condensing pipe 201 is returned to the filter vent vessel 16 by gravity via the outlet pipe 20. Therefore, the effect of reducing the decrease in the scrubbing water 18 in the filter vent vessel 16 can be expected.

The check valve 204 may be a relief valve, and in this case, the relief valve 25 provided on the return pipe 24*a* can be used as the relief valve.

In addition, the natural convection of water may be used to cool the condensing pipe 201. In this case, the condensing pipe 201 can be cooled by installing a cooling water vessel (not shown) at a position higher than the condensing pipe 201 and allowing cooling water to flow into the gap between the pipe jacket 203 and the condensing pipe 201 by a water head difference therebetween.

Figure 6:
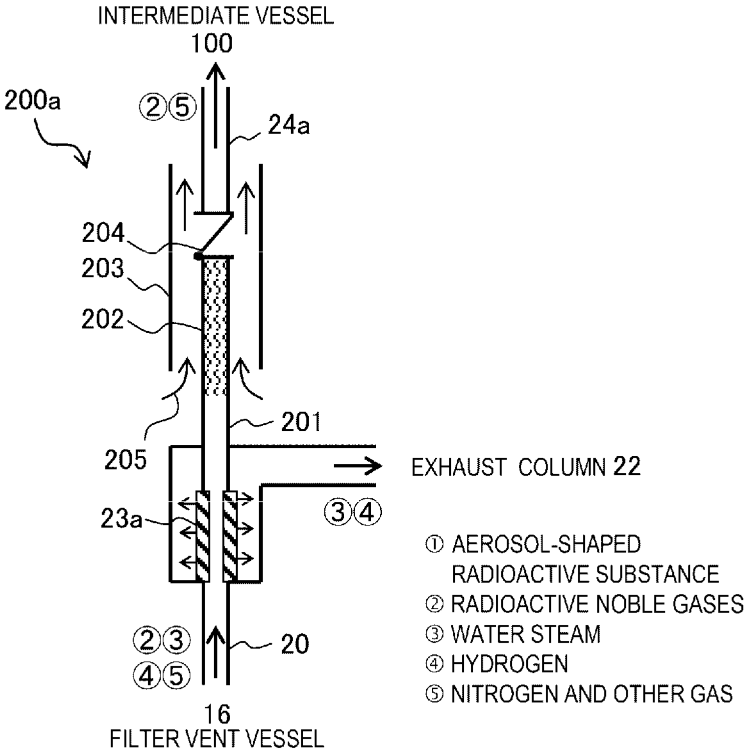
FIG. 6 is a diagram schematically showing an example of a configuration of another non-condensable gas collection system used in the reactor containment vessel vent system according to the third embodiment of the invention.

FIG. 6 is a diagram schematically showing an example of a configuration of another non-condensable gas collection system 200*a* used in the reactor containment vessel vent system 15*b* according to the third embodiment of the invention. Here, the non-condensable gas collection system 200*a* is used in place of the non-condensable gas collection system 200 shown in FIG. 5 in the reactor containment vessel vent system 15*b* (see FIG. 4) according to the third embodiment.

A difference between the configurations of the non-condensable gas collection system 200 shown in FIG. 5 and the non-condensable gas collection system 200*a* shown in FIG. 6 is that the former uses the disk-shaped noble gas filter 23, while the latter uses a cylindrical noble gas filter 23*a*.

That is, in the example of FIG. 6, the cylindrical noble gas filter 23*a* is disposed at a position connecting the outlet pipe 20 and the condensing pipe 201 disposed substantially vertically from below to above, and is installed coaxially with both pipes. Therefore, among the gases flowing into the outlet pipe 20, the steam and the hydrogen gas permeate the noble gas filter 23*a* in a radial direction and reach the exhaust column 22 via a pipe that covers the outside thereof, and are released from the exhaust column 22 to the outside atmosphere.

On the other hand, the non-condensable gases 202 such as the nitrogen or the radioactive noble gases that does not permeate the noble gas filter 23*a* stays in the condensing pipe 201. When the pressure is increased, the gas flows into the intermediate vessel 100 via the check valve 204 and the relief valve 25. Also in the example of FIG. 6, the outer peripheral portion of the check valve 204 and the condensing pipe 201 is covered with the cylindrical pipe jacket 203. Therefore, the non-condensable gases 202 staying in the condensing pipe 201 is cooled by the cold outside air 205 flowing in the outer peripheral portion thereof. Therefore, even if the non-condensable gases 202 is mixed with the steam, the steam is removed by condensing so that only the non-condensable gases 202 flows into the intermediate vessel 100 and is stored therein.

The principle of the non-condensable gas collection in the non-condensable gas collection system 200*a* as described above is almost the same as the principle of the non-condensable gases collection described with reference to FIG. 5. Therefore, even in the non-condensable gas collection system 200*a* in the example of FIG. 6, the non-condensable gases can be collected, and the collected non-condensable gases 202 can be stored in the intermediate vessel 100.

Here, it is assumed that the condensing pipe 201 is disposed at a position higher than the filter vent vessel 16. In this case, the condensed water condensed in the condensing pipe 201 is returned to the filter vent vessel 16 by gravity via the outlet pipe 20. Therefore, the effect of reducing the decrease in the scrubbing water 18 in the filter vent vessel 16 can be expected.

In addition, the natural convection of water may be used to cool the condensing pipe 201. In this case, the vessel of the cooling water is installed at a position higher than the condensing pipe 201, and cooling water flows into the gap between the condensing pipe 201 and the pipe jacket 203 by the water head difference to cool the outer peripheral surface of the condensing pipe 201.

As described above, in the present embodiment, the intermediate vessel 100, the non-condensable collection mechanisms 200, 200*a*, the relief valve 25, and the check valve 26 which are provided to reduce the pressure of the immediate upstream portion of the noble gas filter 23 are passive components that operate without external power such as a power supply. Therefore, the reactor containment vessel vent system 15*b* according to the present embodiment can continuously reduce the pressure in the reactor containment vessel 1 without releasing the radioactive noble gases to the outside even when the unlikely event such as lost of the power supply occurs. At this time, it is also possible to prevent the pressure in the reactor containment vessel 1 from reducing more than necessary.

Other non-condensable gas collection systems 200, 200*a* used in the reactor containment vessel vent system 15*b* according to the third embodiment described above may be applied to the reactor containment vessel vent system 15*a* according to the second embodiment.

Fourth Embodiment

Figure 7:
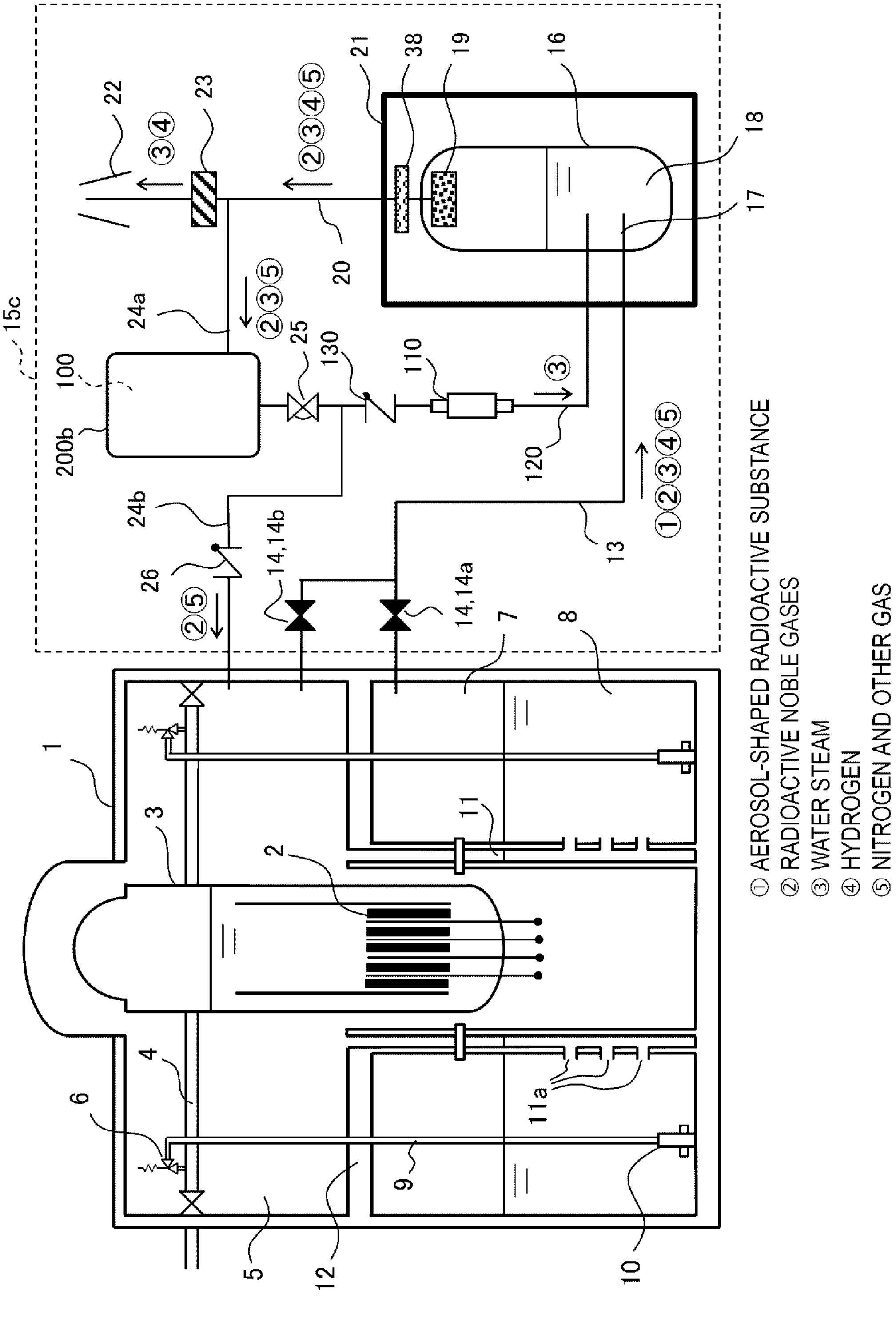
FIG. 7 is a diagram schematically showing an example of a configuration of a reactor containment vessel vent system according to a fourth embodiment of the invention.

FIG. 7 is a diagram schematically showing an example of a configuration of a reactor containment vessel vent system 15*c* according to a fourth embodiment of the invention. In FIG. 7, an example of a configuration of the reactor containment vessel vent system 15*c* according to the present embodiment is shown in a broken-line frame, and an example of a schematic cross-sectional structure of the reactor containment vessel 1 is shown on a left side of the frame.

The configuration of the reactor containment vessel vent system 15*c* according to the present embodiment is largely different from the reactor containment vessel vent system 15*a* according to the second embodiment (see FIG. 3) in that a non-condensable gas collection system 200*b* including the intermediate vessel 100 is provided. Another difference is that the relief valve 25 is provided not on an upstream side of the non-condensable gas collection system 200*b* but on a downstream side. Further, a pipe on a downstream side of the relief valve 25 is branched into two, one of which is connected to the reactor containment vessel 1 via the check valve 26, and the other is connected to the filter vent vessel 16 via the check valve 130 and the steam trap 110. Hereinafter, these differences will be described.

Figure 8:
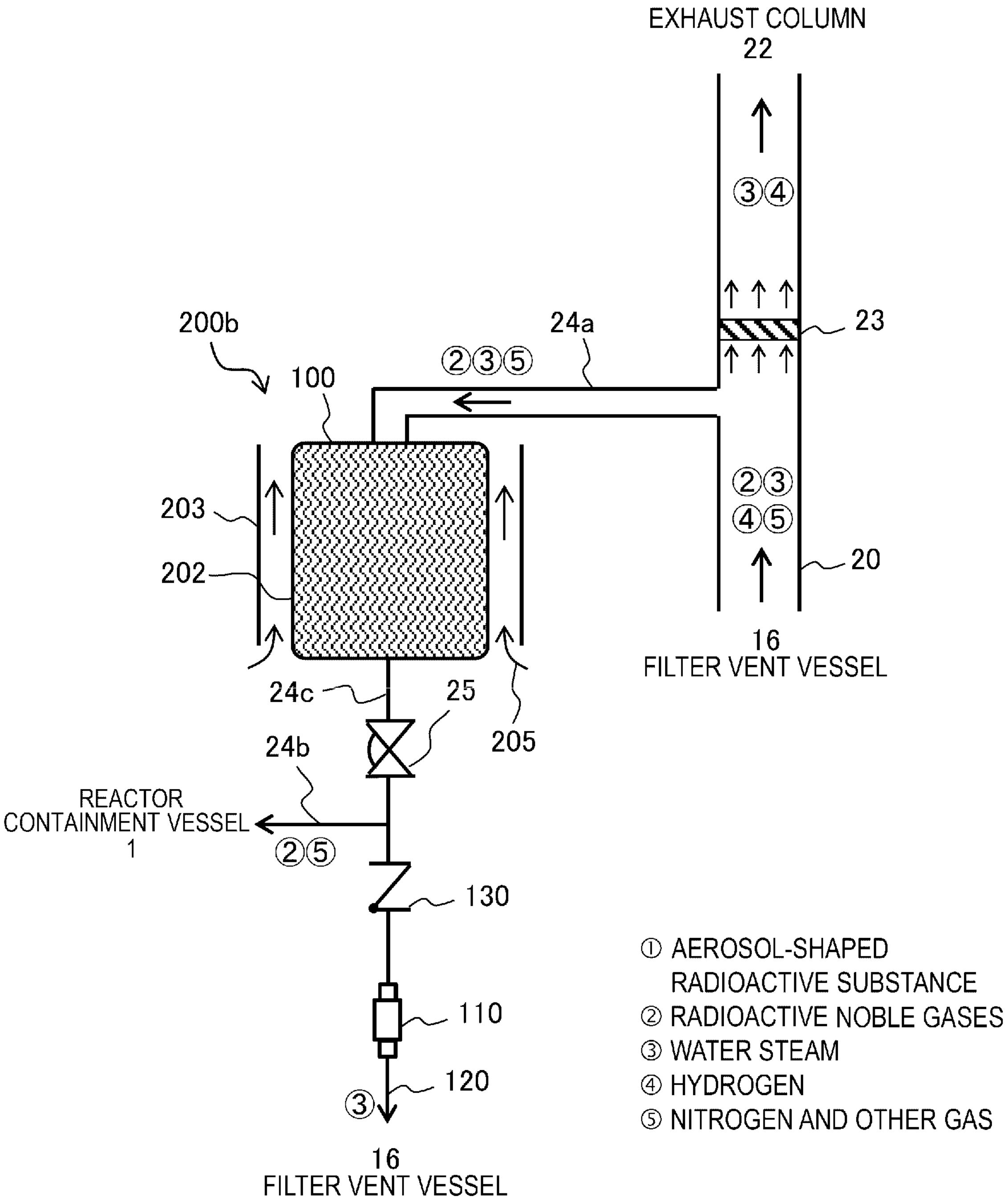
FIG. 8 is a diagram schematically showing an example of a configuration that collects non-condensable gases by a non-condensable gas collection system in the reactor containment vessel vent system according to the fourth embodiment of the invention.

FIG. 8 is a diagram schematically showing an example of a configuration that collects the non-condensable gases 202 by the non-condensable gas collection system 200*b* in the reactor containment vessel vent system 15*b* according to the fourth embodiment of the invention. As shown in FIG. 8, the non-condensable gas collection system 200*b* includes the intermediate vessel 100 that collects and stores the non-condensable gases 202, and the pipe jacket 203 that covers an outer peripheral surface of the intermediate vessel 100 in an up-down direction and allows the outside air 205 to flow through a gap formed between the intermediate vessel 100 and an outer peripheral surface thereof.

In the present embodiment, the intermediate vessel 100 and the immediate upstream portion of the noble gas filter 23 in the outlet pipe 20 are connected by the return pipe 24*a*. Therefore, nitrogen and radioactive noble gases that cannot permeate the noble gas filter 23 stay and are stored in the immediate upstream portion of the noble gas filter 23 and the intermediate vessel 100 with the passage of time. However, at this time, it is considered that steam is also mixed in the intermediate vessel 100.

Here, when the low-temperature outside air 205 flows into the gap between the intermediate vessel 100 and the pipe jacket 203 that covers the outer peripheral portion of the intermediate vessel 100, the temperature of the gas mixed with the steam stored in the intermediate vessel 100 is also reduced. When the temperature becomes equal to or lower than a dew point temperature of the steam, condensation of the steam starts, and the steam is removed from the gas stored in the intermediate vessel 100.

When the pressure in the intermediate vessel 100 exceeds the set pressure PA of the relief valve 25 provided on a return pipe 24*c*, the gas from which the steam stored in the intermediate vessel 100 is removed, that is, the nitrogen and the radioactive noble gases are returned to the reactor containment vessel 1 via the return pipe 24*b*. The condensed water generated in the intermediate vessel 100 is returned to the filter vent vessel 16 via the relief valve 25, the check valve 130, and the steam trap 110 provided on the bypass pipe 120 provided in a downward direction. At this time, the condensed water basically passes through the bypass pipe 120 due to gravity and reaches the filter vent vessel 16.

In the fourth embodiment described above, water may be used for cooling the intermediate vessel 100 by the pipe jacket 203. In this case, a cooling water vessel (not shown) is installed at a position higher than the intermediate vessel 100, and cooling water flows into the gap between the pipe jacket 203 and the intermediate vessel 100 by using the water head difference therebetween, thereby cooling the intermediate vessel 100.

The relief valve 25 provided on the return pipe 24*c* is not necessary. If the check valve 26 is installed on the return pipe 24*b*, even if the relief valve 25 is not installed, the function of collecting and storing the non-condensable gases 202 by the non-condensable gas collection system 200*b* is maintained.

A connection destination of the bypass pipe 120 may be either the upstream side or the downstream side of the filter vent vessel 16. Furthermore, the check valve 130 provided on the bypass pipe 120 is also not necessary. However, when the check valve 130 is provided, a backflow of the fluid from the filter vent vessel can be prevented. The noble gas filter 23 provided in the outlet pipe 20 may have a disk shape used in the example of FIG. 5 or a cylindrical shape used in the example of FIG. 6.

As described above, in the present embodiment, the non-condensable collection mechanisms 200*b*, the relief valve 25, and the check valve 26 which are provided to reduce the pressure of the immediate upstream portion of the noble gas filter 23 are passive components that operate without external power such as a power supply. Therefore, the reactor containment vessel vent system 15*c* according to the present embodiment can continuously reduce the pressure in the reactor containment vessel 1 without releasing the radioactive noble gases to the outside even when the unlikely event such as lost of the power supply occurs. At this time, it is also possible to prevent the pressure in the reactor containment vessel 1 from reducing more than necessary.

The invention is not limited to the above-described embodiments and modifications and includes various modifications. For example, the above-described embodiments have been described in detail in order to facilitate the understanding of the invention, but the invention is not necessarily limited to all of the described configurations. A part of the configuration of one embodiment or modification can be replaced with the configuration of another embodiment or modification, and the configuration of another embodiment or modification can also be added to the configuration of one embodiment or modification. In a part of a configuration of each embodiment or modification, a configuration of another embodiment or modification can be added, removed, or replaced.

REFERENCE SIGN LIST

1 reactor containment vessel
2 reactor core
3 reactor pressure vessel
4 main steam pipe

5 dry well
6 steam relief safety valve
7 wet well
8 suppression pool
9 steam relief safety valve exhaust pipe
10 quencher
11 vent pipe
11*a* vent pipe exhaust portion
12 diaphragm floor
13 vent pipe
14 isolation valve
15, 15*a*, 15*b*, 15*c* reactor containment vessel vent system
16 filter vent vessel
17 inlet pipe
18 scrubbing water
19 metal filter
20 outlet pipe
21 shield wall
22 exhaust column
23 noble gas filter
24*a*, 24*b*, 25*c* return pipe
25 relief valve
38 iodine filter
100 intermediate vessel
110 steam trap
120 bypass pipe
130 check valve
200, 200*a*, 200*b* non-condensable gas collection system
201 condensing pipe
202 non-condensable gases
203 pipe jacket
204 check valve
205 outside air

The invention claimed is:

1. A reactor containment vessel vent system that reduces pressure in a reactor containment vessel by releasing vent gas in the reactor containment vessel to the atmosphere, the reactor containment vessel vent system comprising:

a vent line that forms a vent gas flow path through which the vent gas is discharged from the reactor containment vessel and released to the atmosphere;

a noble gas filter provided at a downstream portion of the vent line, the noble gas filter allowing at least steam of the vent gas to pass through and not allowing radioactive noble gases of the vent gas to pass through;

a return pipe that directly connects a portion of the vent line that is immediately upstream of the noble gas filter and the reactor containment vessel;

an intermediate vessel provided on the return pipe and connected to the reactor containment vessel via the return pipe;

a first check valve provided at a portion of the return pipe between the intermediate vessel and the reactor containment vessel;

a relief valve provided at a portion of the return pipe that connects the portion of the vent line that is immediately upstream of the noble gas filter and the intermediate vessel; and a non-condensable gas collection system provided at the portion of the return pipe that connects the portion of the vent line that is immediately upstream of the noble gas filter and the intermediate vessel, between the relief valve and the portion of the vent line that is immediately upstream the noble gas filter;

wherein the reactor containment vessel vent system is configured such that when a pressure of an immediate upstream portion of the noble gas filter exceeds a first set pressure, the radioactive noble gases that cannot permeate the noble gas filter flow into the intermediate vessel and are stored therein, and when a pressure in the intermediate vessel exceeds a pressure in the reactor containment vessel, the radioactive noble gases stored in the intermediate vessel flow into the reactor containment vessel via the first check valve provided on the return pipe; and wherein the intermediate vessel and the first check valve are passive components that operate without external power and facilitate the flow of the radioactive noble gases from the intermediate vessel into the reactor containment vessel via the first check valve even during a power outage.

2. The reactor containment vessel vent system according to claim 1, wherein the relief valve is configured to open when the pressure of the immediate upstream portion of the noble gas filter exceeds the first set pressure.

3. The reactor containment vessel vent system according to claim 2, wherein the relief valve is configured to close when the pressure of the immediate upstream portion of the noble gas filter falls below a second set pressure that is lower than the first set pressure.

4. The reactor containment vessel vent system according to claim 1, wherein the non-condensable gas collection system includes a condensing pipe, a pipe jacket configured to allow in outside air, and a second check valve disposed inside the pipe jacket.

5. A reactor containment vessel vent system that reduces pressure in a reactor containment vessel by releasing vent gas in the reactor containment vessel to the atmosphere, the reactor containment vessel vent system comprising:

a vent line that forms a vent gas flow path through which the vent gas is discharged from the reactor containment vessel and released to the atmosphere;

a noble gas filter provided at a downstream portion of the vent line, the noble gas filter allowing at least steam of the vent gas to pass through and not allowing radioactive noble gases of the vent gas to pass through;

a radioactive substance removal apparatus including a filter vent vessel and an iodine filter;

a return pipe that directly connects a portion of the vent line that is immediately upstream of the noble gas filter and the reactor containment vessel in an arrangement in which the noble gas filter is directly connected to the return pipe via the portion of the vent line that is immediately upstream of the noble gas filter, and the radioactive substance removal apparatus is directly connected to the return pipe via the portion of the vent line that is immediately upstream of the return pipe;

an intermediate vessel provided on the return pipe;

a first check valve provided at a portion of the return pipe between the intermediate vessel and the reactor containment vessel;

a relief valve provided at a portion of the return pipe that connects the portion of the vent line that is immediately upstream of the noble gas filter and the intermediate vessel; and a non-condensable gas collection system provided at the portion of the return pipe that connects the portion of the vent line that is immediately upstream of the noble gas filter and the intermediate vessel, between the relief valve and the portion of the vent line that is immediately upstream the noble gas filter;

wherein the reactor containment vessel vent system is configured such that when a pressure of an immediate upstream portion of the noble gas filter exceeds a first set pressure, the radioactive noble gases that cannot permeate the noble gas filter flow into the intermediate vessel and are stored therein.

6. The reactor containment vessel vent system according to claim 5, wherein the non-condensable gas collection system includes a condensing pipe, a pipe jacket configured to allow in outside air, and a second check valve disposed inside the pipe jacket.

* * * * *